United States Patent [19]

Kamakura

[11] 4,171,865

[45] Oct. 23, 1979

[54] BINOCULAR PROVIDED WITH FOCUS AND ZOOM ADJUSTING ARRANGEMENTS

[76] Inventor: Ichiro Kamakura, c/o Kamakura Kohki Kabushiki Kaisha, No. 6-12, Tsukagoshi 3-Chome, Warabi-Shi, Saitama-Ken, Japan

[21] Appl. No.: 878,743

[22] Filed: Feb. 17, 1978

[51] Int. Cl.² .................. G02B 7/06; G02B 7/10
[52] U.S. Cl. ........................... 350/41; 350/36
[58] Field of Search .............. 350/41, 40, 43, 44, 350/76, 77, 187, 255, 36

[56] References Cited
U.S. PATENT DOCUMENTS

| 937,834 | 10/1909 | Martin et al. | 350/44 |
| 2,988,955 | 6/1961 | Goto et al. | 350/77 |
| 2,988,974 | 6/1961 | Clifford et al. | 350/76 |
| 3,069,972 | 12/1962 | Tibbetts et al. | 350/41 |
| 4,066,329 | 1/1978 | Van Exel | 350/77 |

*Primary Examiner*—Jon W. Henry
*Attorney, Agent, or Firm*—Michael J. Striker

[57] ABSTRACT

The present invention relates to focus and zoom adjusting levers in a binocular which are mounted in parallel with each other on a center shaft between a left side housing and a right side housing of the binocular body. By turning alternately the above two levers each of which is of a wing shape, a focus and zoom adjustment can be made smoothly and speedily, and a correct object is obtainable.

4 Claims, 10 Drawing Figures

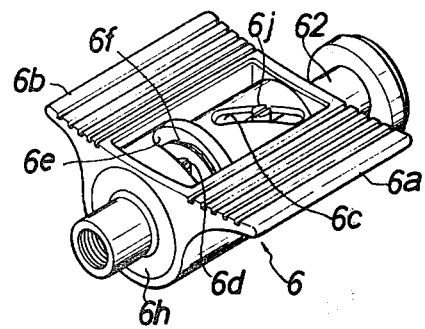
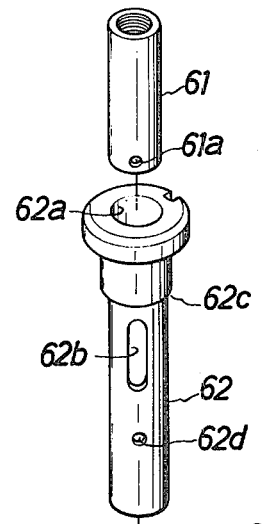
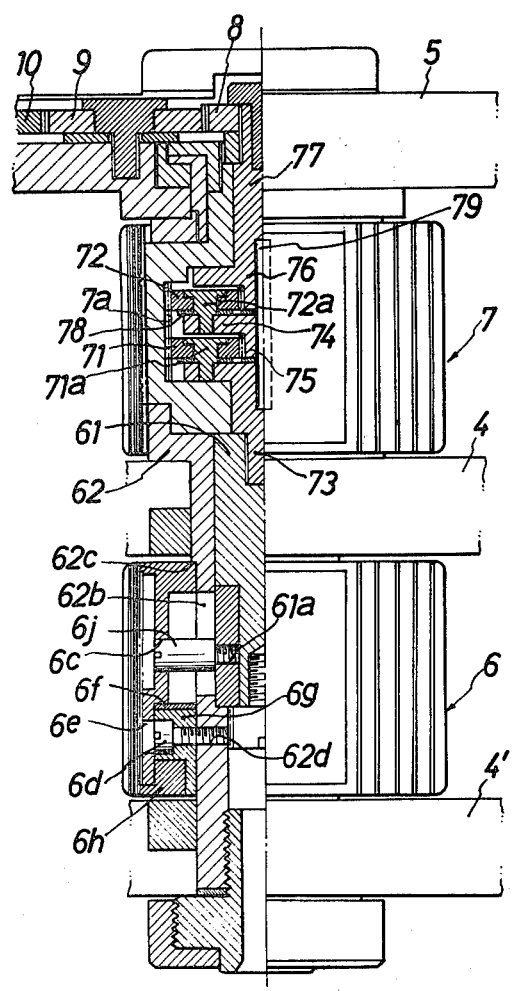
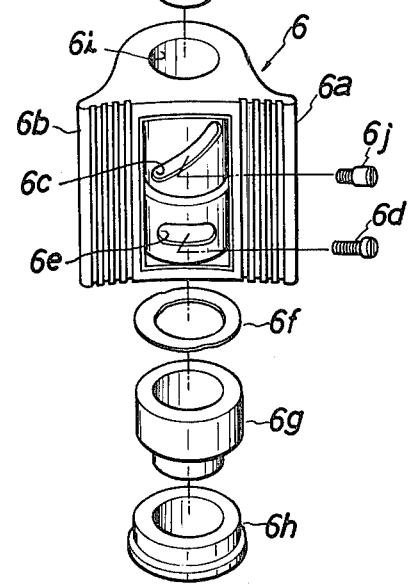

BINOCULAR PROVIDED WITH FOCUS AND ZOOM ADJUSTING ARRANGEMENTS

BACKGROUND OF THE INVENTION

A conventional binocular includes two indispensable means, that is, a focus adjusting wheel and a zoom adjusting wheel or lever. The focus adjustment is made by rotating a wheel mounted on a center shaft between two left side and right side housings. When a viewer rotates this focus adjusting wheel by a finger while holding the both housings in both hands, the disadvantage is that a binocular body is apt to be moved due to a certain shaking of either finger or hand. Finally, an object for viewing is out of focusing.

On the other hand, a conventional zoom adjustment is also inconvenient in use. The current normal zoom adjustment is made by rotating a lever projected from an eye lens means. While a viewer is holding a binocular housing by one hand, he or she is obliged to operate the above zoom adjusting lever by the other hand. Accordingly, it is unavoidable to prevent a certain shaking of a binocular body. In order to overcome the foregoing disadvantages of the above conventional technique, the present invention has been achieved.

SUMMARY OF THE INVENTION

It is therefore an object of this invention to provide a binocular which can carry out smoothly a focus and zoom adjustment by turning a focus adjusting lever and a zoom adjusting lever, both of which are mounted in parallel with each other on a center shaft between a left side housing of and a right side housing of the binocular body.

It is another object of this invention to provide a binocular which can carry out a focus adjustment smoothly by turning one adjusting lever which is mounted on a center shaft between a left side housing of and a right side housing of the binocular body.

It is another object of this invention to provide a binocular which can carry out a zoom adjustment smoothly by one adjusting lever which is mounted on a center shaft between a left side housing of and a right side housing of the binocular body.

It is another object of this invention to provide a binocular in which a turn movement of either one of the two adjusting levers mounted on the center shaft between the two left side and right side housings permits the center shaft to be moved to a horizontal direction, whereby the focus adjustment can be made while a left side eye lens and a right side eye lens are being slidable toward a left side housing and a right side housing respectively.

It is a further object of this invention to provide a binocular in which a turn movement of either one of the two adjusting levers mounted on the center shaft between the two left side and right side housings permits the zoom means incorporated in the two housing to be overdriven by way of plural-stage overdriven gear means having a plurality of gears.

It is still a further object of this invention to provide a binocular in which either the focus adjusting lever or the zoom adjusting lever is of a wing shape at its respective left and right side.

Other objects and advantages of this invention will become apparent during the following discussion of the accompanying drawings.

BRIEF DESCRIPTION OF THE ACCOMPANYING DRAWINGS

Figure 1A:
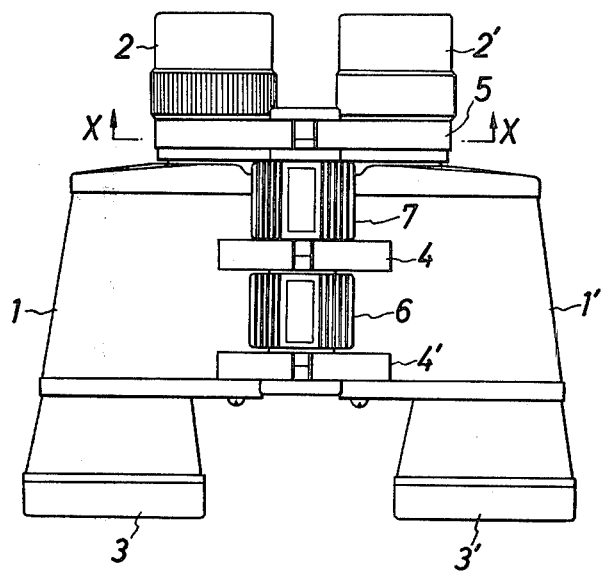
FIG. 1(A) is a top view of a new binocular including a wing-shaped zoom adjusting lever and a wing-shaped focus adjusting lever according to this invention.
Figure 2:
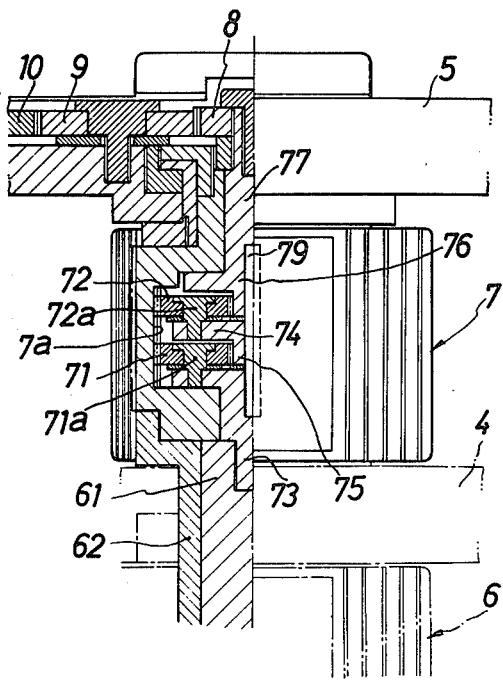

FIG. 2 consists of a vertical section view showing the left side half part of the zoom adjusting lever in FIG. 1(A) and a plan view showing the right side half part thereof.

Figure 1B:
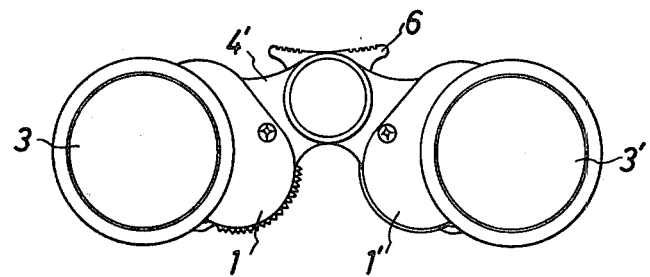
FIG. 1(B) is a front view of the above new binocular as seen from the objective lenses.
Figure 3:
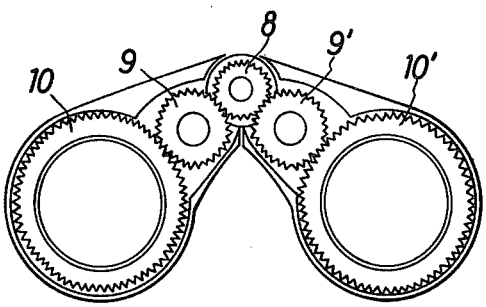

FIG. 3 is an enlarged section view taken at line X—X of FIG. 1.

Figure 4A:
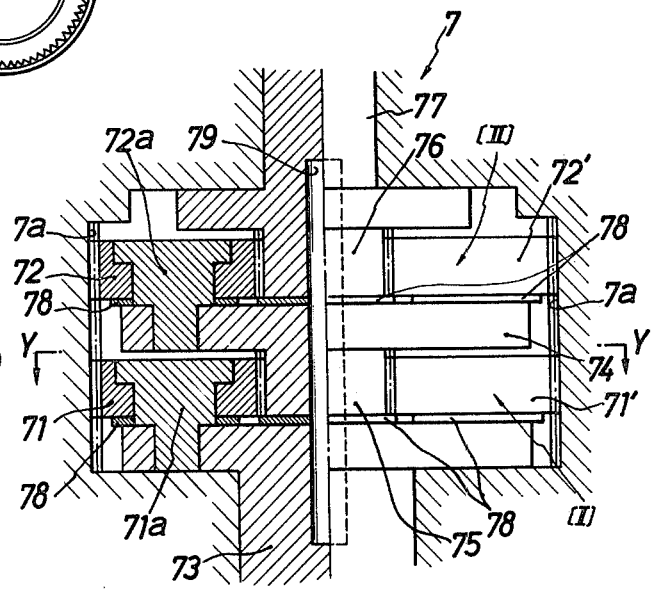

FIG. 4(A) is a partially cutaway section view of gear means of the zoom adjusting lever in FIG. 1(A).

Figure 4B:
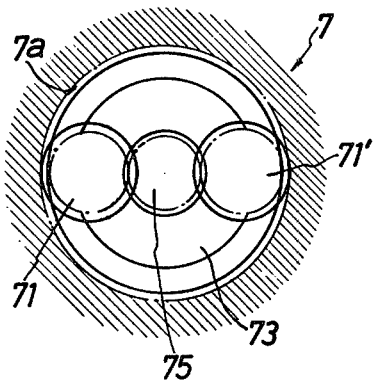

FIG. 4(B) is a front view taken at line Y—Y of FIG. 4(A).

Figure 5:
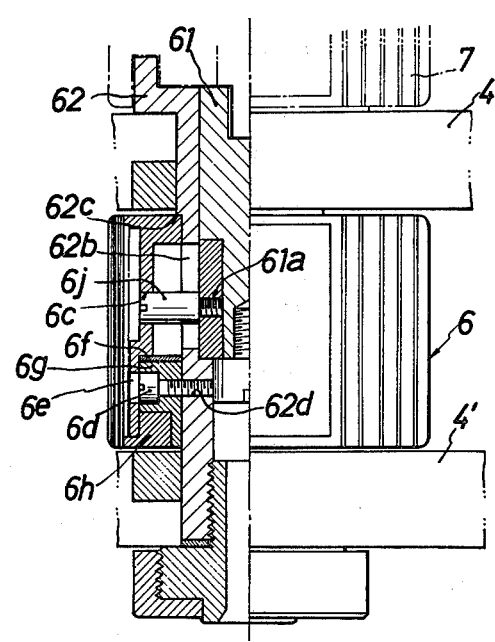

FIG. 5 consists of a vertical section view showing the left side half part of the focus adjusting lever in FIG. 1(A) and a plan view showing the right side view thereof.

FIG. 6(A) is a perspective view of the focus adjusting lever means in FIG. 5.

FIG. 6(B) is an exploded view of the focus adjusting lever means in FIG. 6(A).

FIG. 7 is an enlarged view of combining the zoom adjusting lever with the focus adjusting lever in a binocular according to this invention.

DETAILED DESCRIPTION OF THE INVENTION

Referring first to FIG. 1, a left side housing 1 and a right side housing 1' include prisms (not illustrated) as well as eye lenses 2, 2' and objective lenses 3, 3'.

According to one aspect of the present invention, a focus adjustment is made by sliding both the eye lenses 2, 2' toward the left side and right side housing 1, 1' and a zoom adjustment is made by moving one lens of the eye lens means.

Although the objective lenses 3, 3' are fixed with the both housings 1, 1', the eye lenses 2, 2' as a whole are slidably moved toward the both housings 1, 1'. And a lens means of the eye lens means is movable independently of the other lens means.

The left side and right side housings 1, 1' are linked with each other by two arms 4, 4', and the eye lens means 2, 2' are linked with each other by a longer arm 5. The left side housing 1 as well as the left side eye lens 2 and the right side housing 1' as well as the right side eye lens 2' can be turned about a center shaft linked transversely with the arms 4, 4', 5. Thus, an eye-to-eye width adjustment is available.

The remarkable features of a focus adjusting lever 6 and a zoom adjusting lever 7 will now be referred to in detail. The focus adjusting lever 6 as well as the zoom adjusting lever 7 is of a left side and right side wing formed on a tubular plastic mold. Two wing-shaped focus and zoom adjusting levers 6, 7 under the foregoing structure are mounted in parallel with each other on the center shaft of the binocular body. A viewer of the binocular can adjust the focus and zoom adjustment by pushing alternately the left and right surfaces of the wing-shaped focus and zoom adjusting levers with fingers of both hands while the two housings 1, 1' are being secured by both hands.

The relationship between the focus adjusting lever 6 and the zoom adjusting lever 7 will now be explained.

When turning the focus adjusting lever 6, an back and forth moving shaft 61 is movable, and subsequently the zoom adjusting lever 7 as well as the arm 5 are moved upwardly or downwardly. Thus, the both eye lenses 2, 2' linked with each other by the arm 5 are also moved back and forth. However, even if the zoom adjusting lever 7 is turned (or pushed), its movement does not bring any interaction on the focus adjusting lever 6. The back and forth moving shaft 61 of the focus adjusting lever 6 and the upper end of the center shaft 62 are set in a position of non-actuation even if the zoom adjusting lever 7 is turned (or pushed).

As shown in FIG. 3, by actuating a center gear 8 the zoom adjustment is made due to the rotation of larger gears 10, 10' by way of intermediatory gears 9, 9'. Since this is a known art, the detailed explanation will be omitted. Two larger gears 10, 10' are incorporated in the two (left side and right side) housings. In the two housings having zoom lenses there is provided a cam of the focus adjusting means. By rotating a center gear 8 the zoom lenses are adjusted. In order to carry out the zoom adjustment, there is required means for actuating the center gear 8. This actuating means comprise a zoom adjusting lever 7 and two-stage overdrive gears (I), (II) incorporated therein.

Throughout the internal circumference of the zoom adjusting lever 7 there is provided an internal gear 7a (pitch circle: 20, tooth number: 50) with which first-stage gears 71, 71' and second-stage gears 72, 72' are engaged. Each of these internal gears 71, 71'; 72, 72' has the same pitch circle diameter (7.6) and the same tooth number (19). And the first-stage gears and the second-stage gears are placed symmetrically in relation to the rotation of the zoom adjusting lever. The first-stage gears 71, 71' are secured rotatably by a gear screw 71a on an end surface of the shaft 73. The shaft 73 itself is fixed by screwing to the back and forth moving shaft 61. The second-stage 72, 72' are also rotatably secured by a gear screw 72a on a disc plate 74. Further, a small gear 75 (pitch circle diameter: 4.8, tooth number: 12) for overdriving is fixed on an opposite side of the disc plate 74, and engaged with the first-stage gears 71, 71'. Another small gear 76 for overdriving is also provided at the second-stage gear. And an end of the shaft 77 with which the small gear 76 of the second-stage is fixed with the center gear 8 for actuating the zoom lenses. Further, each washer 78 is set between the shaft 73 and each of the first-stage gears 71, 71', 75 as well as between the disc plate 74 and each of the gears 71, 72', 76. Further, a centering rod 79 is inserted in the center of the shaft 73, the disc plate 74 and the shaft 77 respectively.

The function of the zoom adjustment will now be described. When pushing the left wing and right wing of the zoom adjusting lever 7 by fingers of both hands, the first-stage internal gear 71, 71' are rotated along the gear 7a of the internal surface of the lever 7. For instance, when a viewer turns the zoom adjusting lever 7 only by 36° (degree), the first-stage gears 71, 71' are rotated by five teeth. Accordingly, the small gear 75 (having twelve teeth) which is engaged with the first-stage gears 71, 71' is rotated by a (5/12) round. The rotation of the small gear 75 leads to rotation of the disc plate 74. Subsequently, the second-stage gears 72, 72' are rotated by a (5/12) round of the internal gear 7a. That is, the second-stage gears 72, 72' are rotated by 20.8 (twenty point eight) teeth (50×5/12). Although the second-stage gears 72, 72' rotate the small gear 76 by the same tooth number, the tooth number of the small gear 76 is twelve whereby the shaft 77 securing it can carry out an overdrive rotation of 20.8/12 i.e., 1.74 round. Thus, the above overdrive rotation cooperated with the center gear 8 is applied to the present zoom adjustment.

A focus adjusting lever will now be described with reference to the accompanying drawings FIG. 5 and FIG. 6(A) and FIG. 6(B).

The focus adjusting lever 6 of a plastic mold has a right side wing 6a and a left side wing 6b, between which are provided a cam hole 6c formed obliquely in relation to a center shaft 62, and a hole 6e for setting a screw 6d. The width of the setting hole 6e is provided to be larger than that of the cam hole 6c. In the setting hole 6e there are incorporated a wave washer 6f, a fixed ring 6g and a support ring 6h for supporting the fixed ring 6g.

The center cylindrical shaft 62 passes through the center hole 6i of the focus adjusting lever 6, and secures the wave washer 6f and the fixed ring 6g. The fixed ring 6g is fixed with the center shaft 62 by the screw 6d, (for this fixation there is provided a screw hole 62d on the center shaft 62), thereby the wave washer 6f contacting forcibly a larger diameter portion of and a small diameter portion of the focus adjusting lever 6. By this forcible contact an end of the focus adjusting lever 6 is firmly contacted to a partition 62c of the external circumference of the center shaft 62. Accordingly, when rotating the focus adjusting lever 6 about the center shaft 62, the wave washer 6f furnishes a certain proper weight to the rotation of the focus adjusting lever. In other words, the focus adjusting lever 6 can be maintained firmly owing to the resistance of the wave washer 6f.

An back and forth moving shaft 61 is inserted into the center hole 62a of the center shaft 62, and an end of the moving shaft 61 is positioned under a cam hole 62b formed to a straight direction. The cam hole 62b of the center shaft 62 is positioned directly under the obliquely formed cam hole 62b, whereby a cam screw 6j is fixed with a thread hole 61a of the back and forth moving shaft 61 while passing through the obliquely formed cam hole 6c and the cam hole 62b formed straightly. Under the foregoing cam structure, when a viewer rotates the focus adjusting lever 6 by pushing the right side wing 6a and the left side wing 6b alternately by fingers of both hands, the cam screw 6j is guided by the cam hole 6c and the cam hole 62b whereby the shaft 61 can be moved back and forth. Accordingly, the both eye lenses 2, 2' can move to or depart from the left side and right side housings 1, 1' whereby a focus adjustment is available.

According to this new focus adjustment, only one wave washer 6f is completely hidden in the sliding portion between the internal surface of the focus adjusting lever 6, and the fixed ring 6g of the center shaft 62. Therefore, the focus adjusting lever is operated smoothly. Further, the focus adjusting lever 6 is mounted on the center shaft 62 independent of the arms 4, 4', and the arms 4, 4' are not obstacles at all for the rotation of the focus adjusting lever 6.

FIG. 7 is a combination view of the focus adjusting lever 6 and the zoom adjusting lever 7 in the binocular according to this invention. By turning alternately the above two levers each of which is of a wing shape, a focus and adjustment can be made smoothly and speedily, and a correct object is obtainable.

As many apparently widely different embodiments of this invention may be made without departing from the spirit and scope thereof, it is to be understood that this invention is not limited to the specific embodiments thereof except as defined in the appended claims.

What is claimed is:

1. A binocular including a left side housing and a right side housing linked with rotatable arms in relation to a center shaft; and a focus adjusting lever and a zoom adjusting lever both of which are mounted in parallel with each other on the center shaft between the two left side and right side housings, wherein a focus and zoom adjustment is made by turning each adjusting lever.

2. A binocular claimed in claim 1, wherein a turn movement of either the focus adjusting lever or the zoom adjusting lever mounted on the center shaft between the two left side and right side housings permits the center shaft to be moved to a horizontal direction, thereby the focus adjustment being made while a left side eye lens and a right side eye lens are being slidable toward the left side housing and the right side housing respectively.

3. A binocular claimed in claim 1, wherein a turn movement of either one of the two adjusting levers mounted on the center shaft between the two left side and right side housings permits zoom means incorporated in the two housings by way of plural-stage over-driven gear means having a train of gears.

4. A binocular claimed in claim 1, wherein at least one of said focusing adjusting and zoom adjusting levers has a triangular cross-section and includes left and right portions extending laterally towards said left side and right side housings, respectively.

* * * * *